United States Patent
Li et al.

(10) Patent No.: US 7,743,160 B2
(45) Date of Patent: Jun. 22, 2010

(54) SYSTEM AND METHOD OF DELAYING CONNECTION ACCEPTANCE TO SUPPORT CONNECTION REQUEST PROCESSING AT LAYER-7

(75) Inventors: Qing Li, Cupertino, CA (US); Ronald Frederick, Mountain View, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 327 days.

(21) Appl. No.: 11/780,432

(22) Filed: Jul. 19, 2007

(65) Prior Publication Data

US 2008/0244085 A1    Oct. 2, 2008

Related U.S. Application Data (60) Provisional application No. 60/908,927, filed on Mar. 29, 2007.

(51) Int. Cl.
*G06F 15/16* (2006.01)
(52) U.S. Cl. .................. 709/230; 709/227; 370/338
(58) Field of Classification Search ............ 709/230, 709/237, 227; 370/338
See application file for complete search history.

(56) References Cited

U.S. PATENT DOCUMENTS

| | | | |
|---|---|---|---|
| 6,061,341 A | 5/2000 | Andersson et al. | |
| 6,182,139 B1 | 1/2001 | Brendel | |
| 6,330,226 B1 | 12/2001 | Chapman et al. | |
| 6,389,462 B1 | 5/2002 | Cohen et al. | |
| 6,415,329 B1 | 7/2002 | Gelman et al. | |
| 6,484,206 B2 * | 11/2002 | Crump et al. ............... | 709/227 |
| 6,618,359 B1 * | 9/2003 | Chen et al. .................. | 370/242 |
| 6,754,219 B1 * | 6/2004 | Cain et al. .................. | 370/401 |
| 6,781,979 B1 * | 8/2004 | Ebata et al. ................ | 370/338 |
| 6,823,387 B1 | 11/2004 | Srinivas | |
| 6,912,588 B1 | 6/2005 | Jardin et al. | |
| 6,975,647 B2 | 12/2005 | Neale et al. | |
| 7,072,933 B1 | 7/2006 | Lamb et al. | |

(Continued)

FOREIGN PATENT DOCUMENTS

GB    2411313 A    8/2005

(Continued)

OTHER PUBLICATIONS

Bjorn Knutssson and Larry Peterson, Transparent Proxy Signalling, 1999, 11pp.

(Continued)

*Primary Examiner*—Wing F Chan
*Assistant Examiner*—Kostas Katsikis
(74) *Attorney, Agent, or Firm*—Sonnenschein Nath & Rosenthal LLP (57) ABSTRACT

Techniques for suspending a TCP three-way handshake, offering the partial connection to an L-7 application or module at a proxy to perform further processing, and then allowing the L-7 application or module to instruct the proxy's network kernel to perform various actions are described. In various embodiments these actions may include: silently dropping the connection, verbosely rejecting the connection, accepting and processing the connection locally, or forwarding the connection to another proxy or the original destination. This additional functionality is provided, in one particular embodiment, via extensions to the POSIX socket API.

28 Claims, 3 Drawing Sheets

U.S. PATENT DOCUMENTS

| | | | |
|---|---|---|---|
| 7,082,467 | B2 | 7/2006 | Border et al. |
| 7,127,503 | B2 | 10/2006 | Malrnskog |
| 7,290,050 | B1 * | 10/2007 | Smith et al. ................. 709/224 |
| 2003/0005122 | A1 | 1/2003 | Freimuth et al. |
| 2004/0076193 | A1 * | 4/2004 | Nakano et al. .............. 370/526 |
| 2004/0199808 | A1 * | 10/2004 | Freimuth et al. ................ 714/4 |
| 2004/0243703 | A1 | 12/2004 | Demmer et al. |
| 2004/0249948 | A1 | 12/2004 | Sethi et al. |
| 2005/0027872 | A1 * | 2/2005 | Srinivas ...................... 709/227 |
| 2005/0125532 | A1 * | 6/2005 | Kimchi ....................... 709/225 |
| 2005/0141455 | A1 | 6/2005 | Kim et al. |
| 2005/0185668 | A1 | 8/2005 | Williamson et al. |
| 2005/0188101 | A1 * | 8/2005 | Ludwig et al. .............. 709/238 |
| 2005/0240940 | A1 * | 10/2005 | Quinet et al. ............... 719/315 |
| 2006/0072569 | A1 * | 4/2006 | Eppinger et al. ............ 370/389 |
| 2006/0168321 | A1 * | 7/2006 | Eisenberg et al. ........... 709/238 |
| 2006/0168334 | A1 * | 7/2006 | Potti et al. .................. 709/239 |
| 2006/0190612 | A1 | 8/2006 | Kahol et al. |
| 2008/0104252 | A1 * | 5/2008 | Henniger .................... 709/227 |

FOREIGN PATENT DOCUMENTS

| | | |
|---|---|---|
| WO | WO 03/085924 A1 * | 10/2003 |
| WO | 2006077659 A1 | 7/2006 |
| WO | WO 2007/133341 A1 * | 11/2007 |

OTHER PUBLICATIONS

Mark Allman, On the Generation and use of TCP Acknowledgements, Nasa Lewis Research Center/Sterling Software, ACM Computer Communication Review, Oct. 1998, 18 pp.

* cited by examiner

FIGURE 1

(PRIOR ART)

SYSTEM AND METHOD OF DELAYING CONNECTION ACCEPTANCE TO SUPPORT CONNECTION REQUEST PROCESSING AT LAYER-7

RELATED APPLICATIONS

This application is a non-provisional of, claims priority to and incorporates by reference U.S. Provisional Patent Application 60/908,927, filed 29 Mar. 2007.

FIELD OF THE INVENTION

The present invention relates to methods and systems for delaying Transmission Control Protocol (TCP) connection acceptance at an intermediary device (such as a proxy) until high level (e.g., layer-7) modules of said device complete processing tasks and subsequently issue instructions concerning handling of said connections to lower layer protocol modules of said device.

BACKGROUND

Figure 1:
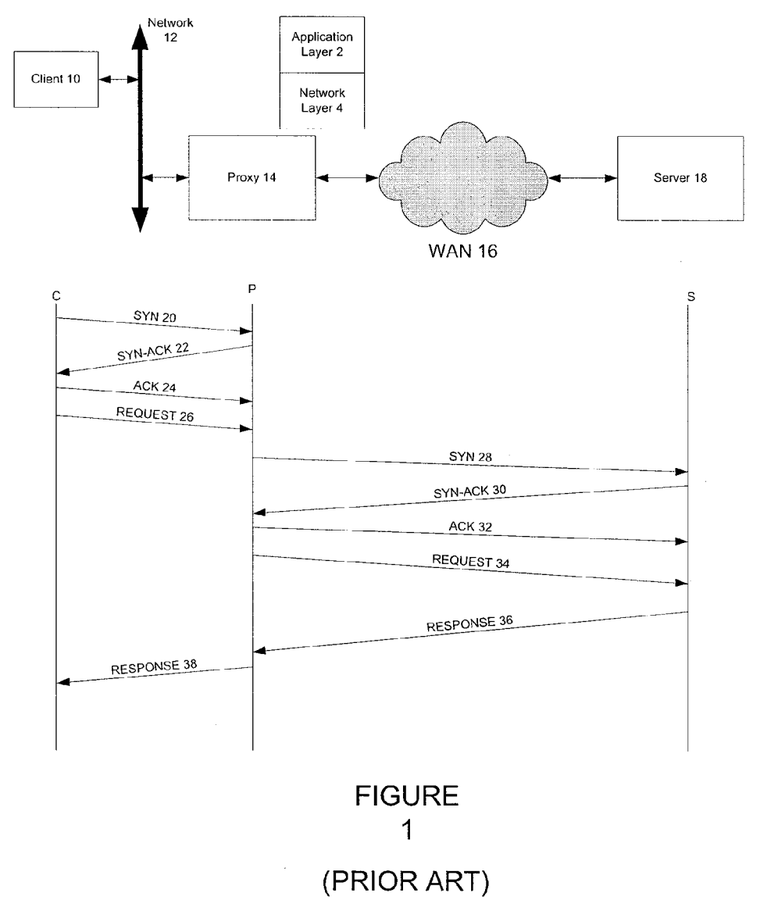
FIG. 1 illustrates a sequence of events involving a TCP connection received at a conventional proxy.

Establishing a TCP connection involves a three-way handshake, where a connection initiator sends a TCP <SYN> packet, the responder sends a corresponding <SYN, ACK> packet, and the initiator acknowledges with a subsequent <ACK> packet. An example of this sequence of events involving a TCP connection received at a conventional proxy is illustrated in FIG. 1. In this example, a client 10 is communicatively connected to a proxy 14 via a network 12. Proxy 14 is communicatively coupled to a server 18 across a wide area network (WAN) 16.

As illustrated, when the client 10 initiates a connection request, a TCP <SYN> packet 20 is transmitted to proxy 14. Proxy 14 responds with a conventional <SYN, ACK> packet 22, which client 10 acknowledges by sending an <ACK> packet 24. Thereafter, client 10 may send an actual request (e.g., an HTTP GET request or other request, for example where client 10 is an application other than a web browser) 26.

Only after completing the TCP handshake with client 10 and receiving an actual request does proxy 14 first attempt to contact server 18. This is because until this point, proxy 14 did not have sufficient knowledge of the intended communication to initiate contact with the server. Hence, proxy 14 initiates its own TCP handshake with server 18 by sending <SYN> packet 28. Server 18 responds by sending <SYN, ACK> packet 30, which the proxy acknowledges with <ACK> packet 32. Thereafter, proxy 14 sends request 34 on to server 18. This may be a modified or unmodified version of the original request 26 sent by client 10.

Assuming everything has gone well to this point in the above-described communication, the client and server will begin exchanging data (e.g., responses 36, 38) with one another via proxy 14. At least two separate TCP sessions are implicated in this communication; one between client 10 and proxy 14 and another between proxy 14 and server 18. However, notice that in the above-described communication the proxy 14 actually completes a TCP handshake with the client 10 before the proxy ever determines whether or not the server 18 is available and/or willing to accept the intended communication. If the proxy is operating in transparent mode, the client will assume that the server 18, and not the proxy 14, has completed the TCP handshake and will begin issuing requests. If the proxy 14 were now to report that it was unable to reach or otherwise complete a TCP handshake with server 18, this could have undesirable consequences for the overall communication and/or any applications executing on client 10.

SUMMARY OF THE INVENTION

In one embodiment, the present invention provides for suspending a TCP connection handshake with a connection initiator; creating a connection state information template to account for the TCP connection with the connection initiator, the connection state information template artificially reflecting a successful, completed connection with the connection initiator; and notifying an application layer process of the artificially reflected successful, completed connection with the connection initiator. The TCP connection handshake may be suspended at a proxy logically disposed between the connection initiator and a target host of the TCP connection.

In some cases, the connection state information template may be created and a state transition performed therein to artificially reflect the successful, completed connection with the connection initiator. Further, a second state transition in the connection state information template may be created to move the TCP connection to an appropriate state following processing of the TCP connection by the application layer process. Thereafter, a response may be sent to the connection initiator, with an action directed by the appropriate state resulting from the second state transition.

The response to the connection initiator may involve silently dropping the TCP connection, rejecting the TCP connection, accepting the TCP connection, or sending an error message to the connection initiator. In the latter case, the error message may be a message indicative of a network error. In other cases, the response to the connection initiator may involve forwarding the TCP connection to a network device other than the connection initiator, or bypassing packets associated with the TCP connection to a target host of the TCP connection.

TCP <SYN> packet received from the connection initiator may be saved during suspension of the TCP connection handshake. Likewise, TCP <SYN, ACK> packets responsive to the <SYN> packet may also be saved during suspension of the TCP connection handshake.

In some cases, a second TCP connection request with the target host of the TCP connection request may be initiated during suspension of the initial TCP connection handshake with the connection initiator. Thereafter, the proxy may respond to the connection initiator so as to emulate a response to the second TCP connection request received from the target host. The second TCP connection handshake with the target host may thus be completed during suspension of the initial TCP connection handshake with the connection initiator.

In some cases, suspending the TCP connection handshake may be facilitated through an extension to a POSIX socket application programming interface (API) on a port on which a TCP connection request is received from the connection initiator. Such an extension to the POSIX socket API causes an accept function for the port to create the connection state information template. The extension to the POSIX socket API further specifies an action to be performed in response to the TCP connection request. Such an action may include: dropping the TCP connection, denying the TCP connection, accepting the TCP connection, bypassing packets associated with the TCP connection, and forwarding the TCP connection to a network device other than the connection initiator.

Further embodiments of the present invention provide for receiving, from a connection initiator, multiple TCP connection requests, each of the requests being transmitted on a different port number; delaying acceptance of all of the multiple TCP connection requests while initiating independent TCP connection requests to a target host of the multiple TCP connection requests on each of the different port numbers; and responding to the connection initiator so as to emulate one or more responses to the independent TCP connection requests received from the target host. Delaying acceptance of all of the multiple TCP connection requests may include suspending TCP connection handshakes corresponding to the multiple TCP connection requests from a connection initiator; creating, for each TCP connection request, a connection state information template to account for a respective one of the multiple TCP connection requests from the connection initiator, each of said connection state information templates artificially reflecting one or a number of a successful, completed connections with the connection initiator; and notifying an application layer process of the artificially reflected successful, completed connections with the connection initiator. Responding to the connection initiator may include completing a TCP connection handshake with the connection initiator on one of the different port numbers that corresponds to a port number on which a response to the independent TCP connection requests was received from the target host.

BRIEF DESCRIPTION OF THE DRAWINGS

The present invention is illustrated by way of example and not limitation, in the figures of the accompanying drawings, in which:

FIGS. 2-6 illustrate various scenarios in which a client is attempting to open a connection to a proxy, which suspends the TCP handshake process with the client and attempts to establish communication with a server, in particular.

DETAILED DESCRIPTION

Described herein are methods and systems for delaying Transmission Control Protocol (TCP) connection acceptance at an intermediary device (such as a proxy) until high level (e.g., layer-7) modules of said device complete processing tasks and subsequently issue instructions concerning handling of said connections to lower layer protocol modules of said device. In various embodiments, Common Internet File System (CIFS) proxy and TCP tunnel proxy functionalities can benefit by advantages offered by this invention. Moreover, split proxies which implement byte-caching transparent tunnel load balancing features may also take advantage of aspects of this invention.

In order to preserve the transparency of a transparent proxy deployment in a network, a client connection request needs to be temporarily suspended until layer 7 (L-7) modules of the proxy have completed some initial request processing. In particular, the proxy must determine which upstream proxy or server to connect to and whether that device is accepting connections. This allows the proxy to preserve the server behavior in the response it generates back to the client.

As indicated above, establishing a TCP connection involves a three-way handshake. In embodiments of the present invention, this TCP three-way handshake is suspended at a proxy disposed between the initiator and the responder (e.g., a client and a server). The proxy offers the resulting partial connection to an L-7 application or module (to permit that module to perform further processing), and then allows the L-7 application or module to issue instructions to the network kernel of the proxy to perform one or more actions. For example, the network kernel may be instructed to: silently drop the connection, verbosely reject the connection, accept and process the connection locally, or forward the connection to another proxy or the original destination (e.g., the content source for the request). In one embodiment this functionality is provided via extensions to the Portable Operating System interface (POSIX) socket application programming interface (API), however this is not critical to the present invention and other equivalent forms of implementation may be used.

In order to better understand aspects of the present invention, it is helpful to consider the sequence of events involving a TCP connection received at a conventional proxy as illustrated in FIG. 1. The precise details of the network configuration by which the client 10 is communicatively connected to proxy 14 are not critical to the present invention. The network 12 may be a wired or wireless network (or both). WAN 16 may be one or more networks and may include the Internet. Server 18 may itself be part of a local area (or even wide area) network (not shown). Such details are not critical to the present invention. As shown, proxy 14 has a software architecture that includes an application (e.g., L-5 to L-7) layer and a network (e.g., L-2) layer. Software operating at other protocol layers (e.g., L-1 to L-4, etc.) may also be present.

As illustrated, when the client 10 initiates a connection request, a TCP <SYN> packet 20 is transmitted to proxy 14. Proxy 14 responds with a conventional <SYN, ACK> packet 22, which client 10 acknowledges by sending an <ACK> packet 24. Thereafter, client 10 may send an actual request (e.g., an HTTP GET request or other request, for example where client 10 is an application other than a web browser) 26.

As discussed above, only after completing the TCP handshake with client 10 and receiving an actual request does proxy 14 first attempt to contact server 18. This could have undesirable consequences for the overall communication and/or any applications executing on client 10. Because of the real possibility for such undesirable consequences, the present invention provides for delaying completion of the client-proxy TCP handshake subject to resolution of the proxy-server communication. In this way the proxy is better able to communicate any problems with the overall connection to the client should such problems exist. Moreover, this solution maintains the transparency of the proxy vis-à-vis the client. In the various scenarios below, readers may find it helpful to remember that one goal of the present solution is to deliver to the client, as closely as possible, a connection experience that would otherwise exist between the client and the server if the proxy were not involved whatsoever. That is, in the case of connection errors with the server, the proxy will provide reports or responses that emulate (as nearly as possible) those which would be received by the client if the client were attempting to connect directly to the server without an intermediary proxy.

When a TCP connection request arrives at the proxy, and delayed connection acceptance in accordance with the present invention is in effect, the TCP three-way handshake with the client is suspended. In one embodiment, the <SYN, ACK> packet which would ordinarily be sent from the proxy to the client is saved and not transmitted to the connection initiator. The original <SYN> packet from the initiator is also saved verbatim, in case the upper-layer returned action (i.e., from the proxy's application layer) is to forward the connection to another appliance.

Suspending the TCP handshake with the client may cause difficulties for the proxy. That is, the proxy's application layer may be unable to proceed without an indication that the client handshake has been completed. Therefore, in one particular embodiment of the present invention a template state information block is created to account for the client-proxy TCP connection. An artificial state transition is performed on this TCP connection such that the L-7 application or module can be notified about the connection and gain access to connection request details.

Once the L-7 application or module completes its processing and determines a corresponding action, another artificial state transition is performed to move the TCP connection into an appropriate state. If the action is to silently drop the packet, the state information block initially created can be destroyed without generating any response to the client. If the action is to verbosely reject the connection, a <RST> packet is sent in response and the state information block is held for a timeout period. If the action is to accept and process the connection, the saved <SYN, ACK> packet is sent in response and the connection is moved into a pseudo-established state until the three-way handshake completes. In the pseudo-established state, client requests are allowed but deferred, unbeknownst to the L-7 application, until the connection with the server is filly established. If the action is to forward the connection, the saved <SYN> packet from the initiator is forwarded and the state information block is destroyed.

Figure 2:
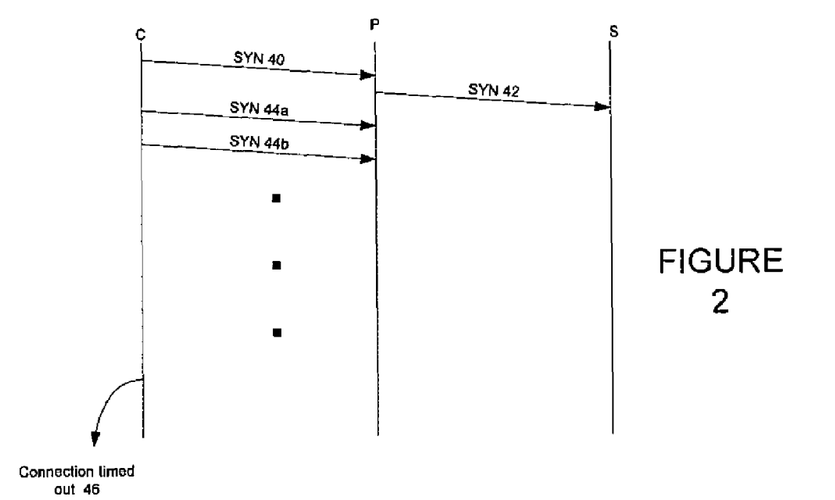
FIG. 2 shows a situation in which the connection is ultimately dropped.

Some of the above concepts can be more readily appreciated by referring to the accompanying diagrams. FIG. 2, for example, illustrates a scenario in which a client (C) is attempting to open a connection by sending a <SYN> packet 40 to the proxy (P). The proxy operates in transparent mode, hence the client is not aware of its presence and believes it is opening a connection with a server (S). The proxy suspends the TCP handshake process with the client and attempts to establish communication with the server by sending a <SYN> packet 42. However, the proxy receives no response (for any of a number of reasons). During this time the client may continue attempting to reach the server (proxy) by resending <SYN> packets 44a, 44b, etc. Likewise, the proxy may continue to attempt to reach the server. However, at some point (e.g., approximately 75 seconds after initiating its attempts to reach the server (proxy)), the client will time out and return an error message 46 to the application executing on the client indicating that time out. In this instance, the proxy does not return any acknowledgment or other communication to the client, thus emulating the behavior that the proxy experienced when trying to reach the server. Hence, the client remains unaware of the proxy's presence yet nevertheless has the same experience (in terms of the type of error experienced) as it would have had if the proxy had not been present at all.

In embodiments of the present invention, the POSIX socket API (or other appropriate API) of the proxy is extended to support enabling "delayed connection acceptance" on listening sockets. When enabled, this causes the accept function to return partially connected sockets as described above. Another extension is then provided to specify the action to perform on that partial connection. Such support actions include:

- Dropping the connection silently (e.g., as discussed above with reference to FIG. 2);
- Denying the connection with a TCP <RST> packet (e.g., as described below with reference to FIG. 3);
- Accepting the connection and completing the TCP three-way handshake (as described below with reference to FIG. 4);
- Bypassing the connection by forwarding the request to the original destination (as described below with reference to FIG. 5); and
- Forwarding the connection request to another proxy (as discussed below with reference to FIG. 6).

If the action is to accept the connection, conventional POSIX I/O calls can be made on the socket as soon as the action is specified. Otherwise, since the action was to not complete the connection, the conventional close functions can be used to clean up the partially connected socket.

Figure 3:
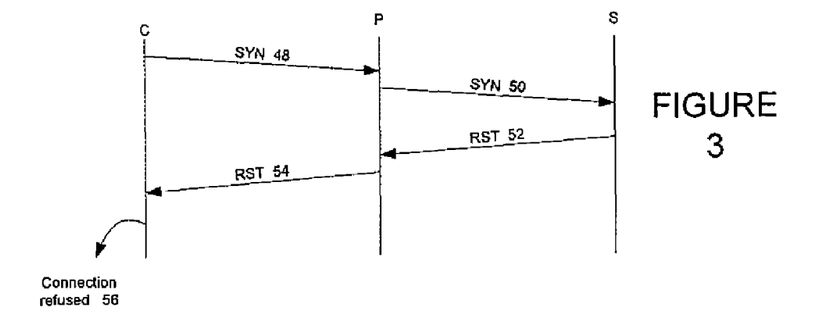
FIG. 3 shows a situation in which the connection is ultimately denied.

Referring to FIG. 3, the scenario depicted is one in which a connection is denied by the server. In this case, the TCP handshake initiated by the client's <SYN> packet 48 is suspended at the proxy (in accordance with the above-described processes) while the proxy attempts to contact the server. To do so, the proxy transmits a <SYN> packet 50 of its own. However, instead of a <SYN, ACK> packet, this time the server returns an <RST> packet 52, indicating the connection has been refused. Accordingly, the proxy returns an <RST> packet 54 of its own to the client, and the client reports the connection as being refused to the application running thereon 56. Other errors, such as a host or network being unreachable, etc., may be dealt with in a similar manner.

Figure 4:
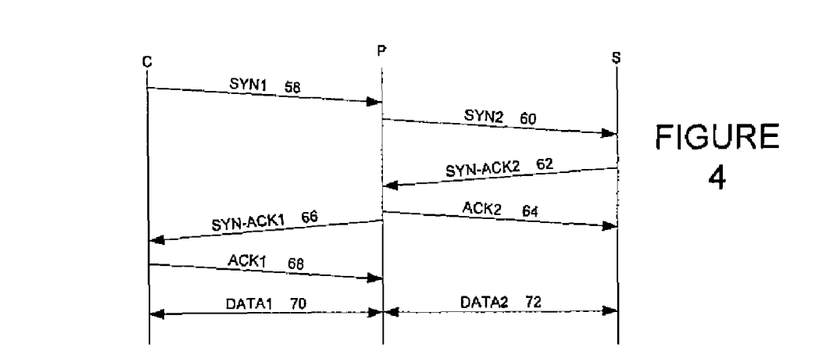
FIG. 4 shows a situation in which the connection is eventually accepted.

Referring to FIG. 4, the case of a connection being accepted is illustrated. Here, two separate TCP connections are involved: one between the client and the proxy, and the other between the proxy and the server. Unlike the conventional case discussed above, however, this time the proxy completes its TCP handshake with the server before it completes the TCP handshake with the client. Thus, before the client is advised of a successful connection, the proxy actually ensures that such a connection is achieved.

More particularly, upon receipt of the client's <SYN1> packet 58, the proxy suspends the TCP handshake with the client and sends its own <SYN2> packet 60 to the server. Here, the labels 1 and 2 are used to highlight the fact that the packets need not be, and often are not, identical. In response to receiving the proxy's <SYN2> packet, the server returns a <SYN, ACK2> packet 62, which the proxy acknowledges using an <ACK2> packet 64. After sending the <ACK2> packet, the proxy also sends an <SYN, ACK1> packet 66 to the client (i.e., in response to the client's <SYN1> packet). The client returns an <ACK1> packet 68 completing the handshake. Data may then be exchanged among the various devices, with the client sending/receiving <DATA1> 70 to/from the proxy and the proxy sending/receiving <DATA2> 72 to/from the server. These data packets need not be identical across each connection.

Figure 5:
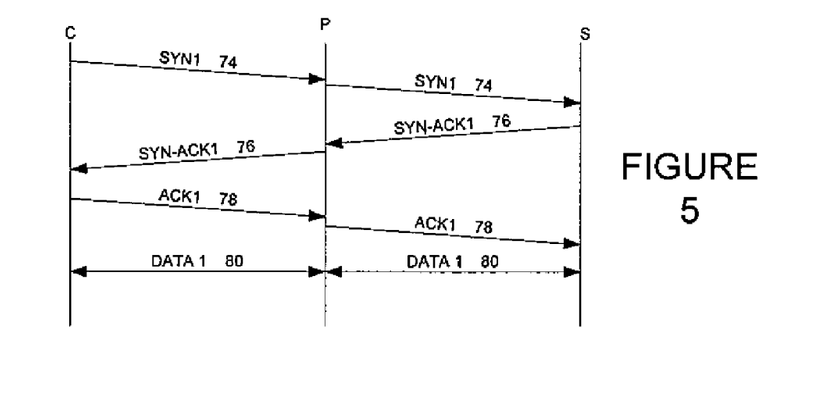
FIG. 5 shows the connection being bypassed and forwarded to its original destination.

FIG. 5 illustrates a so-called "bypass" case. This time, instead of suspending the TCP connection with the client and initiating its own TCP connection with the server, the proxy transmits the same <SYN1> packet 74 that it received from the client to the server. In effect, the proxy passes through the client's <SYN1> packet without itself becoming substantively involved in the communication. Now, when the server returns a <SYN, ACK1> packet 76 (or any other communication, or lack thereof, for that matter), the proxy passes through that packet (or other response, or lack thereof) to the client. In the case where a <SYN, ACK1> packet is received by the client, it returns an <ACK1> packet 78, which the proxy again passes through to the server. Subsequent data communications take place between the client and server, with the proxy effectively passing through the various <DATA 1> packets 80. Note that if the server fails to respond to the <SYN1> packet or returns something other than the <SYN, ACK1> packet, the client will experience the same resulting communication from the server as would be the case if the proxy were not present. Thus, the goal of the present invention is met even in this case where the proxy does not participate substantively in the communication between the client and the server.

Figure 6:
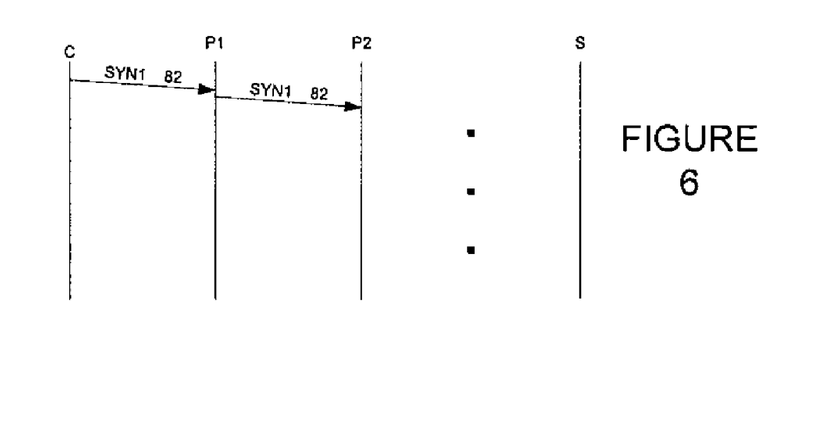
FIG. 6 shows the connection request being forwarded to another proxy.

Referring now to FIG. 6, a case of forwarding is shown. Here, two proxies are disposed between the client and the server. These proxies may operate as a split proxy pair, but this need not necessarily be true. When the client transmits a <SYN1> packet 82 to proxy P1, proxy P1 passes that <SYN1> packet 82 through to proxy P2. More generally, the <SYN1> packet from the initiator is transmitted through the network so that the proxy designated to receive and handle the associated TCP connection receives the <SYN1> packet. Proxy P2 may now perform any of the above-described actions. That is, proxy P2 may initiate a bypass connection, drop the connection silently, deny the connection, accept the connection or even forward the connection request to yet another proxy. Some of these actions will, of course, depend on communications between proxy P2 and the server.

Figure 7:
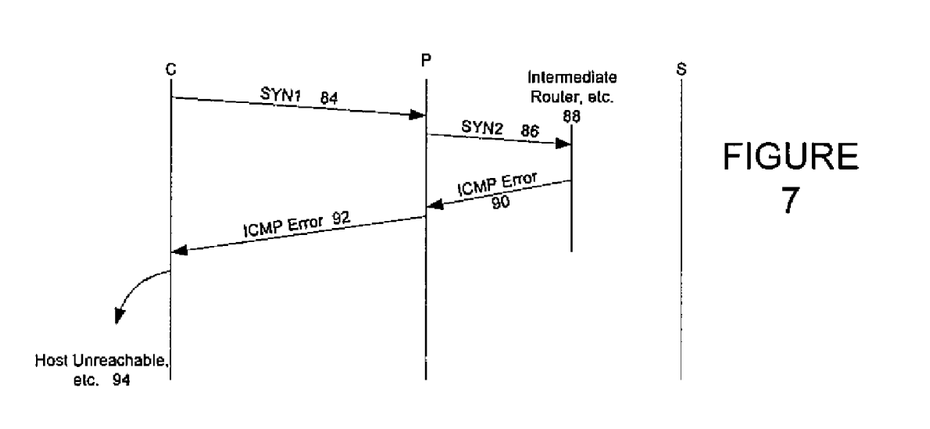
FIG. 7 illustrates a scenario in which a connection request never reaches the server, and instead a network device between the proxy and the server returns an error message.

Yet a further activity is shown in FIG. 7. Here, the proxy receives the <SYN1> packet 84 from the client, suspends the TCP connection with the client, and transmits its own <SYN2> packet 86 to the server. This time, however, that <SYN2> packet never reaches the server. Instead, a network device 88 between the proxy and the server returns an ICMP error of some form (e.g., host unreachable, network unreachable, etc.) 90. Accordingly, the proxy returns the same type of ICMP error message 92 to the client, which reports the error to the application layer 94. Thus, the client experience is the same as it would have been in the absence of the proxy.

By suspending the processing of the client connection request until the proxy can perform some L-7 processing, the proxy is configured to be more flexible about the types of error messages or indications it can return to the client. With a traditional transparent proxy, the client connection appears to be successfully established to the server as soon as the proxy receives the connection, when in fact this connection was only established successfully to the proxy. At this point, the proxy has yet to attempt its connection to the server. If this server connection is unsuccessful, the proxy is forced to drop the already established client connection instead of refusing it as it should have.

With the functionalities offered by the present invention, this problem is avoided. The proxy is able to connect to the server before sending any response to the client. If that connection fails, the same kind of error response returned by the server can be returned to the client. During the L-7 processing, the proxy can also select which error response to return to the client even without first connecting to the server. Alternatively, or in addition, the proxy might connect to the server and use information received from the server to select which type of response to return to the client. Importantly, the proxy can choose to mimic the server's response or can choose any other type of response if such other response would be more appropriate. These decisions can be made based on the information received from the client in its connection request, information already stored at the proxy (e.g., from past activity), and/or information received from the server if the proxy decides to connect to the server.

When an L-7 application or module at the proxy is notified about a new partial connection, the present invention provides connection request details along with the notification. For example, the client and server address and port information may be provided. In addition, information such as TCP options present in the <SYN> packet is accessible. This information is typically used to determine the appropriate action to perform on the connection request. Also, information received from the server (or the absence of a connection with the server) may be used in determining how to respond to the client TCP connection request. The L-7 application may use any or all of this information, together with preconfigured policy rules or heuristics to then determine how (or if) to respond to the client TCP connection request.

As used herein, a software application or module is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. A table, as referred to herein, can be any data structure.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network.

Thus far, the discussion has assumed just one TCP connection request on one port is sent by the connection initiator. However, in general the present invention accommodates situations where multiple TCP connections requests are so sent, each on a different port number. For example, in some embodiments of the invention multiple TCP connection requests by a connection initiator, each request being transmitted on a different port number, are received at the proxy. The proxy may act in accordance with the above-described procedures to delay acceptance of all of the multiple TCP connection requests while initiating independent TCP connection requests to a target host of the initial requests. That is, the proxy initiates multiple, independent TCP connection requests to the target host, at least one each on each of the different port numbers used by the initial requests. Thereafter, the proxy will respond to the connection initiator so as to emulate one or more responses to the independent TCP connection requests received from the target host. In this way, the connection initiator sees the same responses (on a port-by-port basis) that it would have seen from the target host even in the absence of the proxy.

Delaying acceptance of all of the multiple TCP connection requests as discussed above may include suspending TCP connection handshakes corresponding to the multiple TCP connection requests from a connection initiator; and creating, using the above-described processes, for each TCP connection request, a connection state information template to account for a respective one of the multiple TCP connection requests from the connection initiator. Each of the connection state information templates artificially reflects one or a number of successful, completed connections with the connection initiator. Thereafter, the application layer process is notified of the artificially reflected successful, completed connections with the connection initiator. Ultimately, the proxy responds to the connection initiator, for example by completing a TCP connection handshake with the connection initiator on the one of the different port numbers that corresponds to a port number on which a response to the independent TCP connection requests was received from the target host.

Thus, techniques for suspending the TCP three-way handshake, offering the partial connection to an L-7 application or module at a proxy to perform further processing, and then allowing the L-7 application or module to instruct the proxy's network kernel to perform various actions have been described. In various embodiments these actions may include: silently dropping the connection, verbosely rejecting the connection, accepting and processing the connection locally, or forwarding the connection to another proxy or the original destination. This additional functionality is provided, in one particular embodiment, via extensions to the POSIX socket API. Of course, the foregoing examples of embodiments of the present invention are not intended to be restrictive of the scope of the invention, which is best measured in terms of the following claims.

What is claimed is:

1. A method, comprising:
   suspending a transmission control protocol (TCP) connection handshake with a connection initiator while a TCP connection is being established by the connection initiator;
   creating a connection state information template to account for the TCP connection being established by the connection initiator, said connection state information template artificially reflecting a successful, completed connection with the connection initiator; and
   notifying an application layer process of the artificially reflected successful, completed connection with the connection initiator;
   wherein creating the connection state information template comprises creating the connection state information template and performing a state transition therein to artificially reflect the successful, completed connection with the connection initiator; and
   performing a second state transition in the connection state information template to move the TCP connection to an appropriate state following processing of the TCP connection by the application layer process.

2. The method of claim 1, wherein suspending the TCP connection handshake occurs at a proxy logically disposed between the connection initiator and a target host of the TCP connection.

3. The method of claim 1, further comprising responding to the connection initiator with an action directed by the appropriate state resulting from the second state transition.

4. The method of claim 3, wherein responding to the connection initiator comprises silently dropping the TCP connection.

5. The method of claim 3, wherein responding to the connection initiator comprises rejecting the TCP connection.

6. The method of claim 3, wherein responding to the connection initiator comprises accepting the TCP connection.

7. The method of claim 3, wherein responding to the connection initiator comprises sending an error message to the connection initiator.

8. The method of claim 7, wherein the error message comprises a message indicative of a network error.

9. The method of claim 3, wherein responding to the connection initiator comprises forwarding the TCP connection to a network device other than the connection initiator.

10. The method of claim 3, wherein responding to the connection initiator comprises bypassing packets associated with the TCP connection to a target host of the TCP connection.

11. The method of claim 1, further comprising saving a TCP <SYN> packet received from the connection initiator during suspension of the TCP connection handshake.

12. The method of claim 11, further comprising saving a TCP <SYN, ACK> packet responsive to the <SYN> packet during suspension of the TCP connection handshake.

13. The method of claim 1, further comprising initiating a second TCP connection request with a target host of a TCP connection request during suspension of the TCP connection handshake with the connection initiator.

14. The method of claim 13, further comprising responding to the connection initiator so as to emulate a response received from the target host of the TCP connection request responsive to the second TCP connection request.

15. The method of claim 13, further comprising completing a second TCP connection handshake with the target host of the TCP connection request during suspension of the TCP connection handshake with the connection initiator.

16. The method of claim 15, further comprising silently dropping the TCP connection.

17. The method of claim 15, further comprising rejecting the TCP connection.

18. The method of claim 15, further comprising accepting the TCP connection.

19. The method of claim 15, further comprising bypassing packets associated with the TCP connection to the target host of the TCP connection.

20. The method of claim 15, further comprising sending an error message to the connection initiator.

21. The method of claim 20, wherein the error message comprises a message indicative of a network error.

22. The method of claim 15, further comprising exchanging data with the target host of the TCP connection request after completing the second TCP connection handshake.

23. The method of claim 1, wherein suspending the TCP connection handshake is facilitated through an extension to a Portable Operating System interface (POSIX) socket application programming interface (API) on a port on which a TCP connection request is received from the connection initiator.

24. The method of claim 23, wherein the extension to the POSIX socket API causes an accept function for the port to create the connection state information template.

25. The method of claim 24, wherein the extension to the POSIX socket API further specifies an action to be performed in response to the TCP connection request.

26. The method of claim 25, wherein the action to be performed in response to the TCP connection request comprises one of: dropping the TCP connection, denying the TCP connection, accepting the TCP connection, bypassing packets associated with the TCP connection, and forwarding the TCP connection to a network device other than the connection initiator.

27. A method, comprising:
  receiving, from a connection initiator, multiple transmission control protocol (TCP) connection requests, each of the requests transmitted on a different port number;
  delaying acceptance of all of the multiple TCP connection requests while initiating independent TCP connection requests to a target host of the multiple TCP connection requests on each of the different port numbers; and
  responding to the connection initiator so as to emulate one or more responses to the independent TCP connection requests, wherein the responses are received from the target host;
  wherein delaying acceptance of all of the multiple TCP connection requests comprises suspending TCP connection handshakes corresponding to the multiple TCP connection requests from the connection initiator;
  creating, for each TCP connection request, a connection state information template to account for a respective one of the multiple TCP connection requests from the connection initiator, each of said connection state information templates artificially reflecting one or a number of successful, completed TCP connections with the connection initiator; and
  notifying an application layer process of the artificially reflected successful, completed TCP connections with the connection initiator;
  wherein creating the connection state information template comprises creating the connection state information template and performing a state transition therein to artificially reflect the one or a number of successful, completed TCP connections with the connection initiator; and
  performing a second state transition in the connection state information template to move the TCP connections to appropriate states following processing of the TCP connections by the application layer process.

28. The method of claim 27, wherein responding to the connection initiator comprises completing a TCP connection handshake with the connection initiator on one of the different port numbers that corresponds to a port number on which a response to the independent TCP connection requests was received from the target host.

* * * * *